US006549644B1

(12) United States Patent
Yamamoto

(10) Patent No.: US 6,549,644 B1
(45) Date of Patent: Apr. 15, 2003

(54) FACE-IMAGE PROCESSING APPARATUS

(75) Inventor: Takayuki Yamamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/442,243

(22) Filed: Nov. 17, 1999

(30) Foreign Application Priority Data

May 18, 1999 (JP) .......................................... 11-137702

(51) Int. Cl.[7] .................................................. G06K 9/00
(52) U.S. Cl. ...................................... 382/118; 382/117
(58) Field of Search ................................ 382/117, 118, 382/203, 103, 171, 173; 348/78

(56) References Cited

U.S. PATENT DOCUMENTS 5,119,439 A  *  6/1992  Osawa et al. ................ 382/199
6,055,323 A  *  4/2000  Okumura ..................... 382/115

FOREIGN PATENT DOCUMENTS

JP          8-175218       7/1996    ........... B60K/28/06

* cited by examiner

*Primary Examiner*—Amelia M. Au
*Assistant Examiner*—Colin LaRose
(74) *Attorney, Agent, or Firm*—Sughrue Mion, PLLC

(57) ABSTRACT

A means 9 for extracting the characteristic of the multi-value image causes an extracting filter to perform spiral retrieval so as to extract a nostril region from an image of the face input by a CCD camera 2 so as to cause the nostril region to be stored in the binarized image memory 10. The eye retrieving range is specified by using, as a reference, the position of the nostrils which is an intermediate point of the positions of the centers of gravity of the nostrils in the binarized nostril region stored in the binarized image memory 10. Then, an extracting filter is used to extract an eye region from the image of the face so as to store the eye region in the binarized image memory 10. The opening/closing determining means 11 determines opening/closing of the eyes in accordance with the binarized eye region.

2 Claims, 10 Drawing Sheets

- P PIXEL OF INTEREST
- F TWO-DIMENSIONAL FILTER REFERENCE PIXEL

■ PIXEL AT WHICH SPIRAL RETRIEVAL IS STARTED

☐ PIXEL EXTRACTED BY SPIRAL RETRIEVAL

☐ TWO-DIMENSIONAL FILTER PASS PIXEL

US 6,549,644 B1

FACE-IMAGE PROCESSING APPARATUS

BACKGROUND OF THE INVENTION

The present invention relates to a face-image processing apparatus for determining a state of opening/closing of the eyes by performing an image process.

As a conventional face-image processing apparatus using a template, an apparatus disclosed in, for example, the Unexamined Japanese Patent Application Publication No. Hei.8-175218 is known. The foregoing apparatus incorporate a template producing means for producing a subject template for a person to be detected by sequentially moving a standard-face template determined previously with respect to a photographed image into all directions to perform correlation calculations; and an eye-region detecting means for detecting an eye region of the person to be detected, by performing correlation calculations by using the subject template.

FIG. 12 is a schematic diagram showing the structure of a face-image processing apparatus disclosed in the Unexamined Japanese Patent Application Publication No. Hei.8-175218 and using template matching.

Referring to FIG. 12, reference numeral 1 represents a person to be detected, 2 represents a camera for photographing the person 1 to be detected and 3 represents an image processing apparatus connected to the camera 2 and incorporating an A/D converter, a normalizing circuit and a correlation calculating circuit. Reference numeral 4 represents a memory connected to the image processing apparatus 3 and having a standard template and layout data about elements of the face including the eyes, eyebrows and so forth previously stored therein. Reference numeral 5 represents an ECU connected to the image processing apparatus 3 and serving as an electronic control unit to which a result of the process performed by the image processing apparatus 3 is supplied. Reference numeral 6 represents an alarm unit connected to the ECU 5.

The conventional face-image processing apparatus structured as described above is arranged such that the camera 2 supplies an image of the face of the person 1 to be detected, to the image processing apparatus 3. The image processing apparatus 3 converts the supplied image signal into a digital signal, followed by performing a process for normalizing light and shade, and followed by supplying a result of the process to the ECU 5. The ECU 5 determines a driving state of the person to be detected, in accordance with the result of the process, followed by outputting a control signal to the alarm unit 6 to issue an alarm.

If the face is moved vertically, the positional relationship between the eyes and the eyebrows in the vertical direction is not changed. Therefore, the conventional face-image processing apparatus using the template is able to reliable specify the eye region such that black portions in the upper portions of the region are eyebrows and black portions in the lower portions of the region are the eyes when a region adjacent to the eyes has been detected by using a region adjacent to the subject eyes. If the movement of the face is factored in, matching of the template must be performed by scanning a large range of the image. As a result, a long time is required to complete the correlation calculations.

SUMMARY OF THE INVENTION

To achieve the foregoing problem, an object of the present invention is to obtain a face-image processing apparatus which is capable of specifying the eye region by raising the processing speed and determining opening/closing of the eyes.

According to the present invention, there is provided a face-image processing apparatus comprising: image input means for inputting an image of the face; a nostril-region extracting means for extracting a binarized nostril region from the input image of the face; an eye-region extracting means for extracting a binarized eye region from the image of the face by using the binarized nostril region extracted by the nostril-region extracting means as a reference point; and opening/closing determining means for determining opening/closing of the eyes in accordance with the binarized eye region extracted by the eye-region extracting means.

The nostril-region extracting means extracts a nostril region at a predetermined point at which the retrieval is started by sequentially and spirally retrieving a portion surrounding a retrieval start point.

The apparatus further comprises a memory for storing one frame of the image of the face input by the image input means, wherein the image of the face in the quantity of one frame is used in a process for extracting the nostril region which is performed by the nostril-region extracting means and a process for determining opening/closing of the eyes which is performed by the opening/closing determining means.

The point at which the retrieval is started by the nostril-region extracting means is the position of a center of gravity calculated from the nostril region of the image of the face in the previous frame.

The point at which the retrieval is started by the nostril-region extracting means consists of two positions apart from each other for the same distance from a peak position of a projected histogram of the image of the face in a horizontal direction of the image of the face.

DETAILED DESCRIPTION OF THE PREFERRED EMBODIMENTS

First Embodiment

A first embodiment of the present invention will now be described with reference to the drawings.

Figure 1:
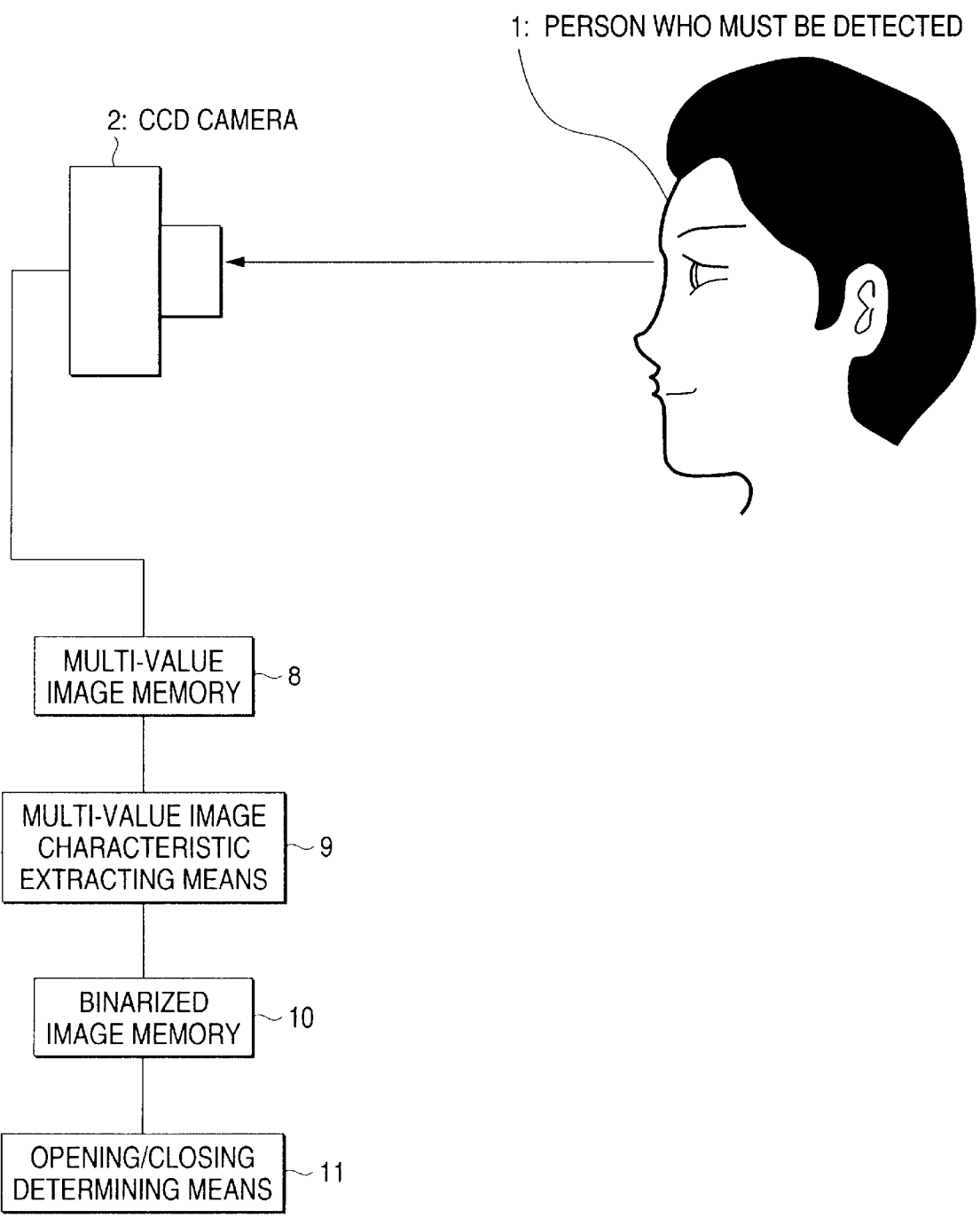
FIG. 1 is a schematic view showing the structure of a face-image processing apparatus according to a first embodiment of the present invention.

FIG. 1 is a schematic view showing the structure of a face-image processing apparatus according to the first embodiment of the present invention.

Referring to FIG. 1, reference numeral 1 represents a person to be detected and 2 represents a CCD camera which is an image input means for photographing an image of the face of the person 1 who must be detected so as to input the image. Reference numeral 8 represents a multi-value image memory for temporarily storing a multi-value image output from the CCD camera 2. Reference numeral 9 represents a means for extracting a characteristic of the multi-value image arranged to extract eye and nostril regions from the multi-value image by using distribution of relative brightness and incorporating a nostril-region extracting means for extracting a nostril region and an eye-region extracting means for extracting an eye region. Reference numeral 10 represents a binarized image memory for temporarily storing a result of extraction of the characteristic of the multi-value image as a binarized image. Reference numeral 11 represents an opening/closing determining means for determining opening/closing of the eyes in accordance with a fact whether or not a region in which the eyes have been binarized exist. The means 9 for extracting the characteristic of the multi-value image and the opening/closing determining means 11 are realized by software which is executed by a microcomputer or the like.

Figure 2:
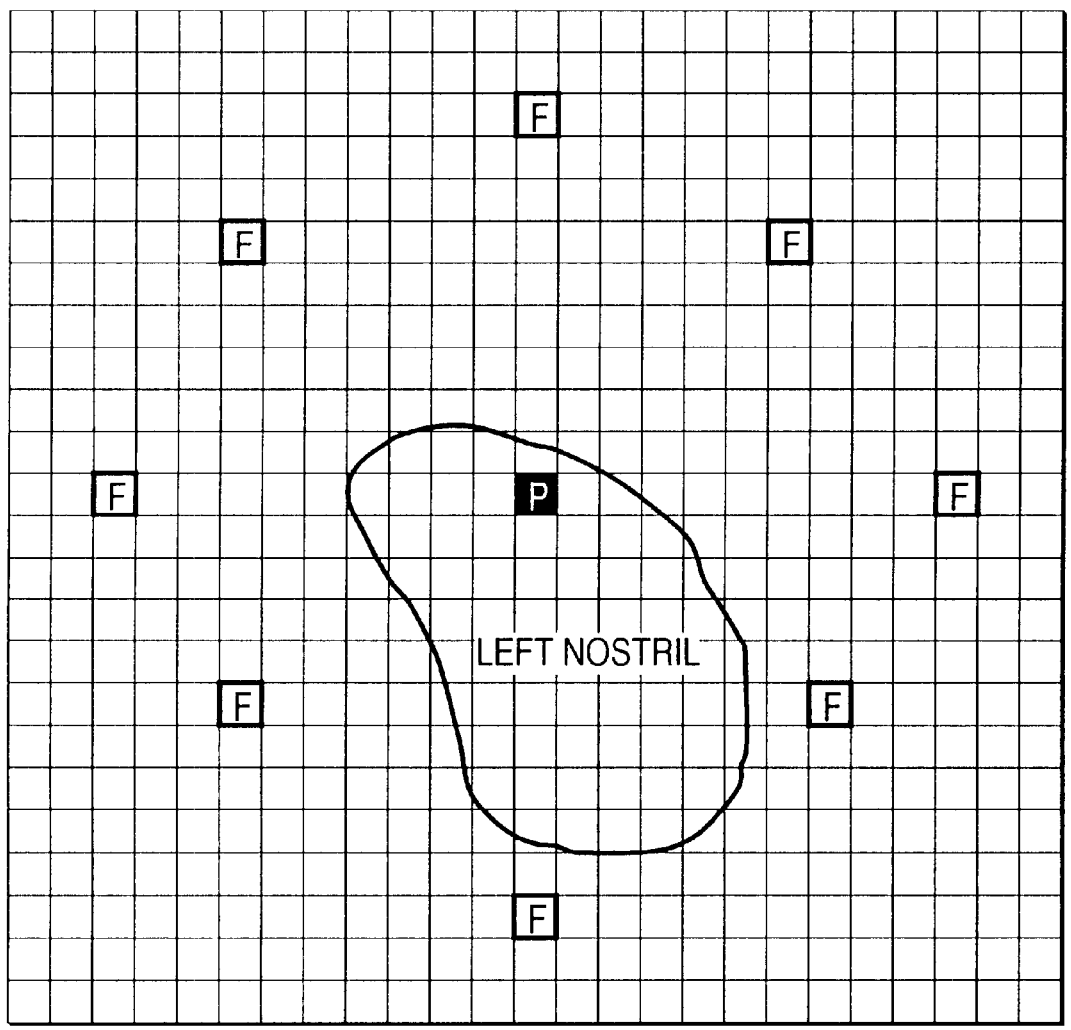
FIG. 2 is a diagram showing a filter of the face-image processing apparatus according to the first embodiment of the present invention for two-dimensionally extracting the nostrils.

FIG. 2 is a diagram showing a filter of the face-image processing apparatus according to the first embodiment of the present invention, the filter being arranged to two-dimensionally extract nostrils.

Figure 3A:
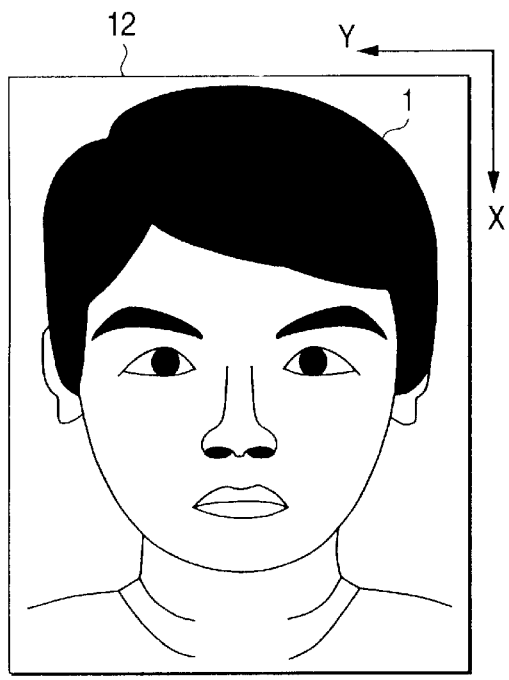
FIGS. 3A and 3B are diagrams showing a multi-value image and a binarized image obtained by the face-image processing apparatus according to the first embodiment of the present invention.
Figure 3B:
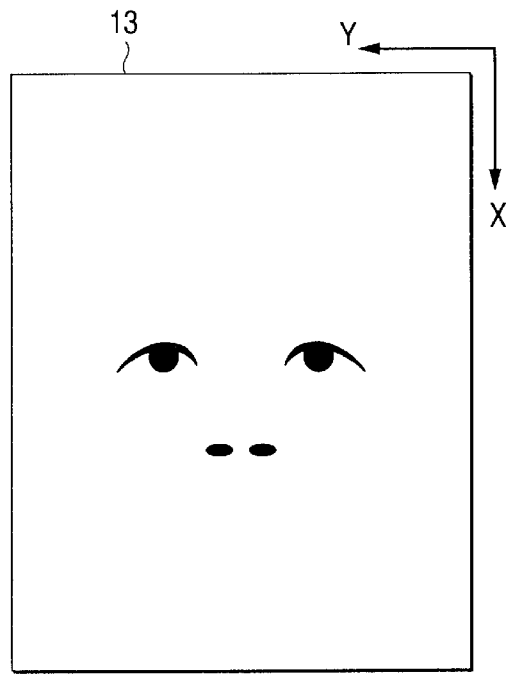

FIGS. 3A and 3B are diagrams showing a multi-value image and a binarized image obtained by the face-image processing apparatus according to the first embodiment of the present invention. FIG. 3A shows a multi-value image stored in the multi-value image memory 8. FIG. 3B shows a binarized image stored in the binarized-image memory.

Referring to FIGS. 3A and 3B, reference numeral 1 represents a person to be detected, 12 represents an original image and 13 represents a binarized image.

Figure 4:
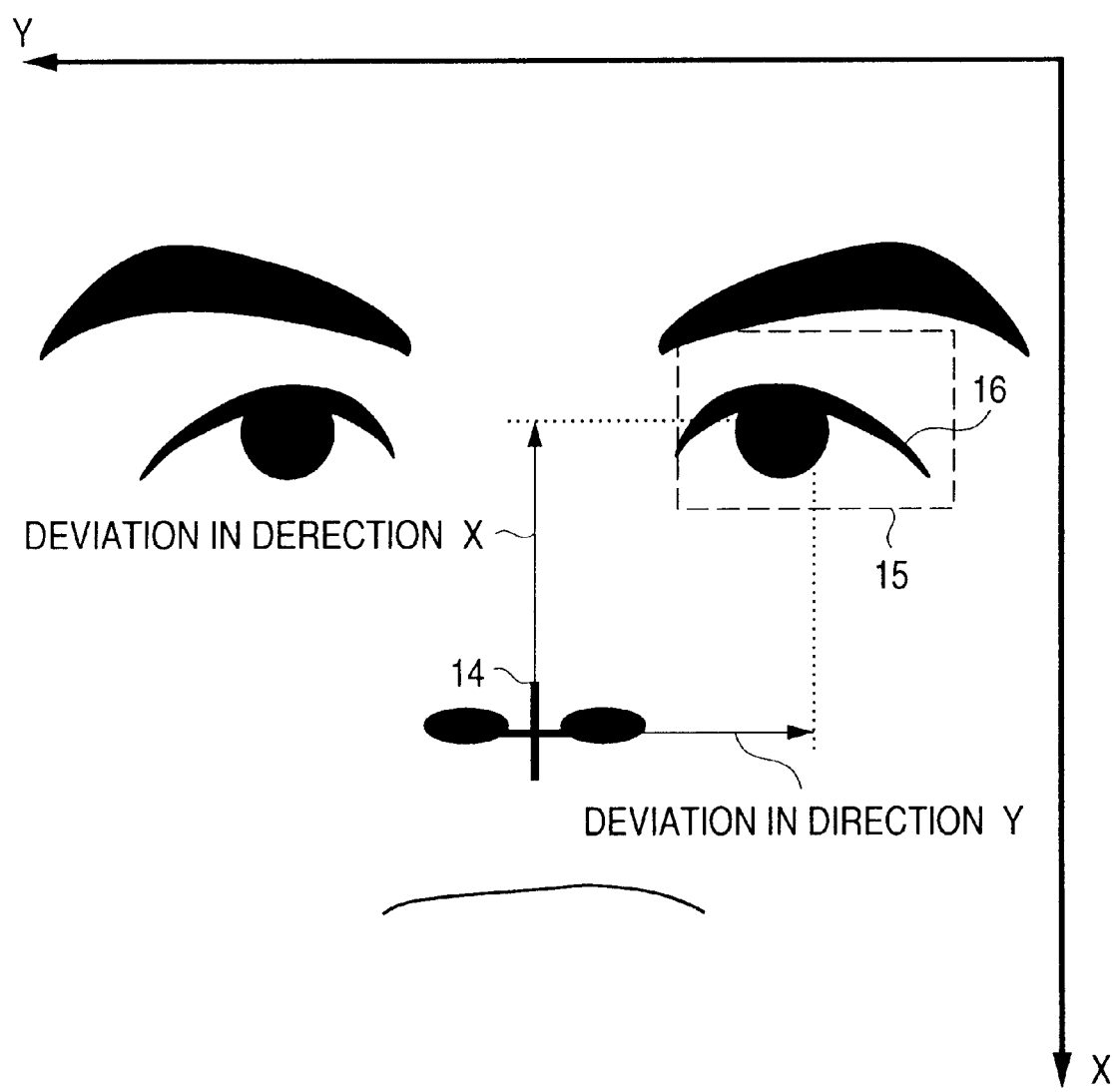
FIG. 4 is a diagram showing setting of an eye retrieving region with respect to the positions of the nostrils which is performed by the face-image processing apparatus according to the first embodiment of the present invention.

FIG. 4 is a diagram showing a process of the face-image processing apparatus according to the first embodiment of the present invention for setting an eye retrieving region with reference to the positions of the nostrils.

Referring to FIG. 4, reference numeral 14 represents the position of the nostrils, 15 represents an eye retrieving range and 16 represents a region in which the eyes have been binarized.

Figure 5:
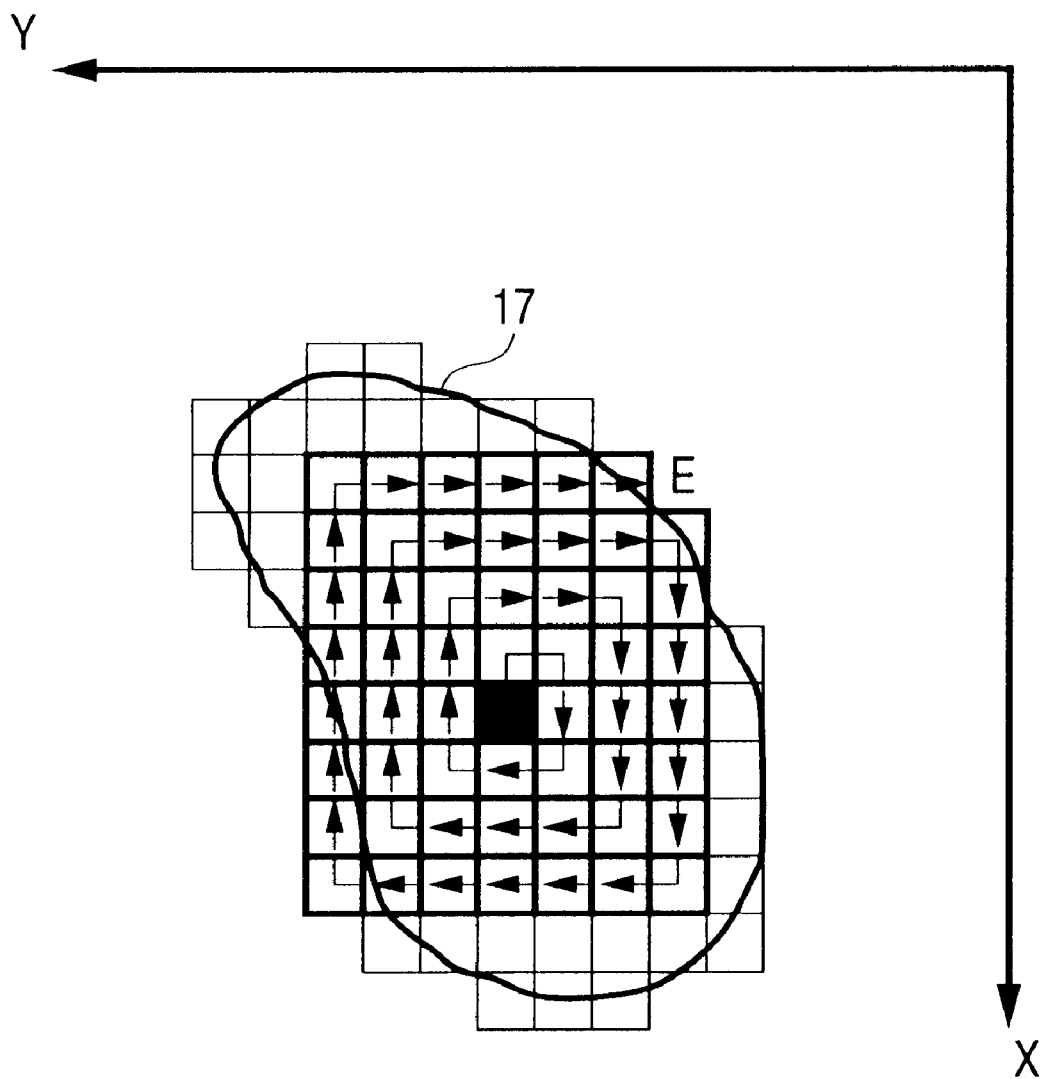
FIG. 5 is a diagram showing spiral retrieval of the nostrils which is performed by the face-image processing apparatus according to the first embodiment of the present invention.

FIG. 5 is a diagram showing a process of the face-image processing apparatus according to the first embodiment of the present invention for spirally retrieving the nostrils.

Referring to FIG. 5, reference numeral 17 represents a left-nostril region.

Figure 6A:
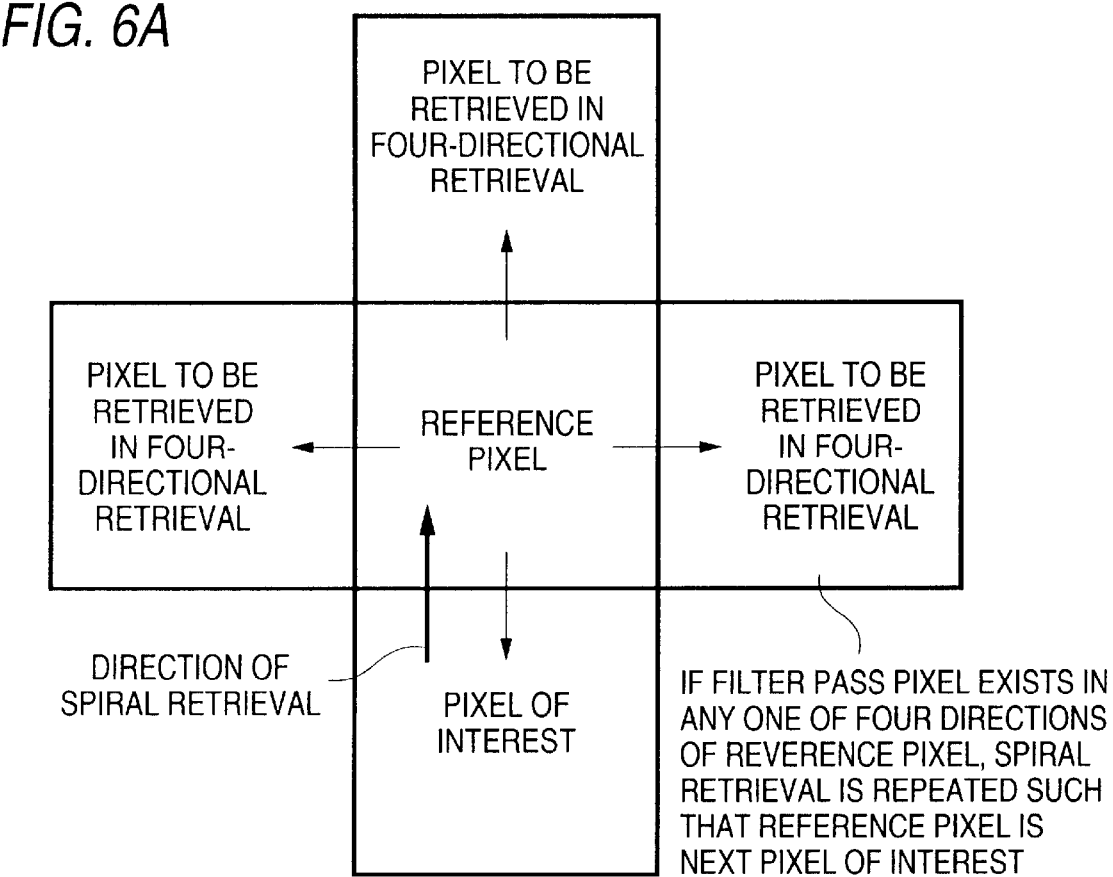
FIGS. 6A and 6B are diagrams showing conditions under which spiral retrieval of the nostrils are performed by the face-image processing apparatus according to the first embodiment of the present invention.
Figure 6B:
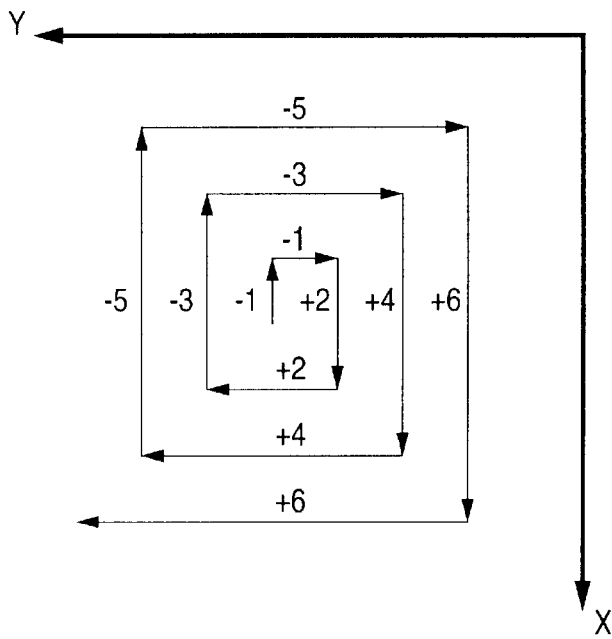

FIGS. 6A and 6B are diagrams showing conditions under which the process of the face-image processing apparatus according to the first embodiment of the present invention for spirally retrieving the nostrils is performed. FIG. 6A is a diagram showing a method of selecting a pixel of interest. FIG. 6B shows a spiral-retrieval table for setting a reference pixel with respect to the pixel of interest.

Figure 7:
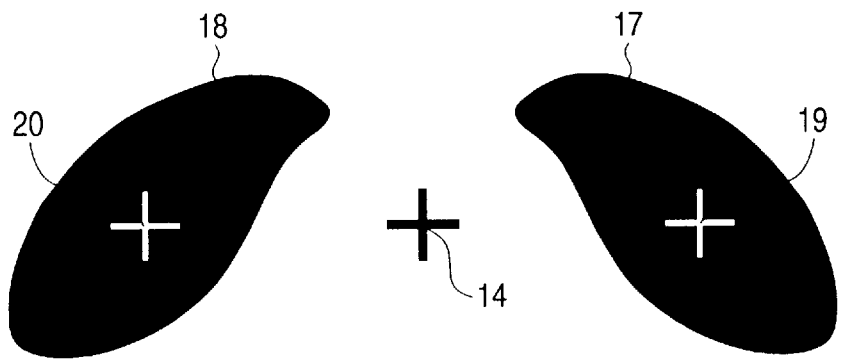
FIG. 7 is a diagram showing centers of gravity of the right and left nostril regions and the positions of the nostrils realized by the face-image processing apparatus according to the first embodiment of the present invention.

FIG. 7 is a diagram showing the positions of the center of gravity of the right and left nostril regions and the nostrils obtained by the face-image processing apparatus according to the first embodiment of the present invention.

Referring to FIG. 7, reference numeral 14 represents the same element as that shown in FIG. 4. Reference numeral 17 represents the same element as that shown in FIG. 5. Reference numeral 18 represents a right nostril region, 19 represents the position of the center of gravity of the left nostril and 20 represents the position of the center of gravity of the right nostril.

Figure 8:
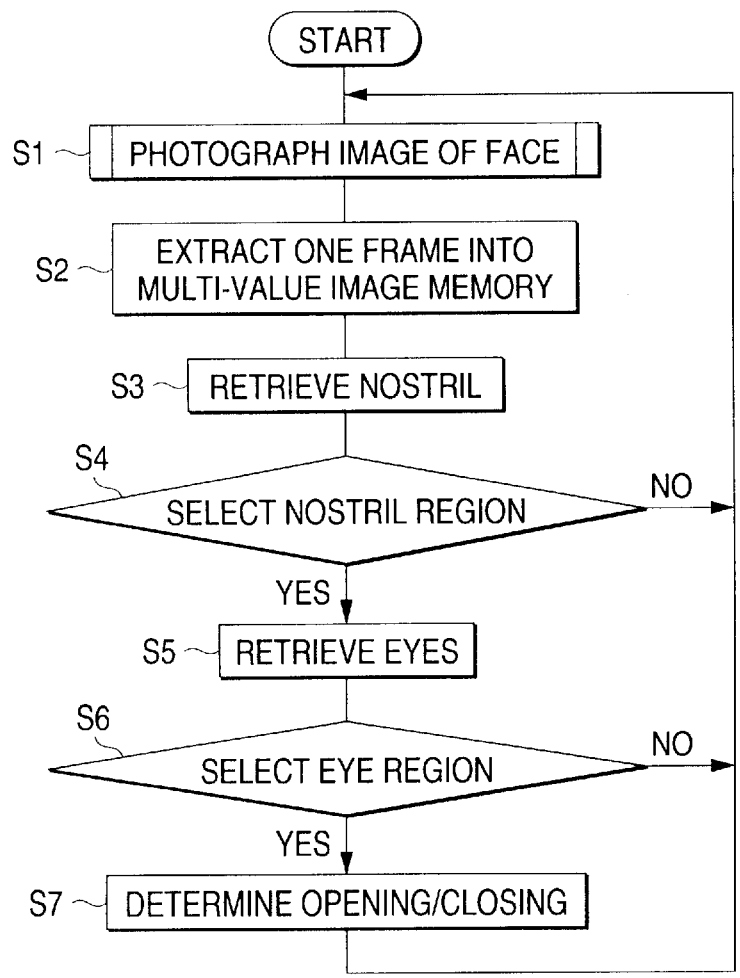
FIG. 8 is a flow chart of an algorithm for tracing the eyes and nostrils adapted to the face-image processing apparatus according to the first embodiment of the present invention.

FIG. 8 is a flow chart showing an algorithm employed by the face-image processing apparatus according to the first embodiment of the present invention and arranged to trace the eyes and nostrils.

Figure 9:
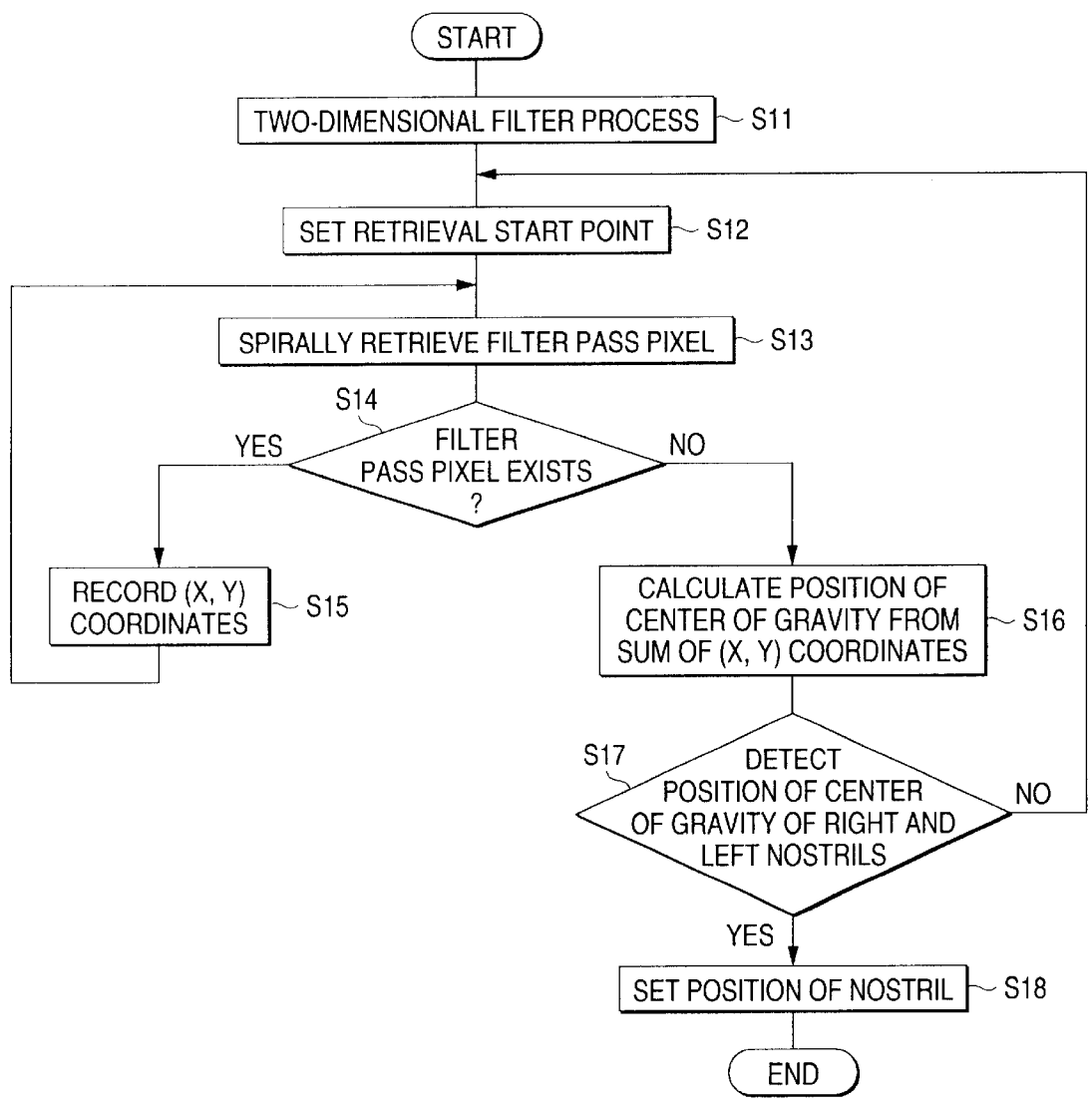
FIG. 9 is a flowchart of an algorithm for spirally retrieving the eyes and nostrils adapted to the face-image processing apparatus according to the first embodiment of the present invention.

FIG. 9 is a flow chart showing an algorithm employed by the face-image processing apparatus according to the first embodiment of the present invention and arranged to spirally retrieve the nostrils.

The operation will now be described with reference to the flow chat shown in FIG. 8.

An image of the face photographed in step S1 is, in step S2, stored in the multi-value image memory 8 in a quantity corresponding to one frame. A multi-value image output from the multi-value image memory 8 in step S2 is subjected to a process of the nostril-region extracting means for retrieving the nostrils in step S3 and a process of the eye region extracting means for retrieving the eyes in step S5.

FIG. 2 is a diagram showing a two-dimensional extracting filter for use in the retrieval of the nostrils which is performed in step S3. If the brightness of pixel P of interest and that of the filter reference pixel F satisfy required conditions, the pixel P of interest is determined that the pixel P of interest has allowed to pass through the filter and written on the binarized image memory 10. All of the pixels in the retrieval window are subjected to the foregoing filter process. Thus, a result of the extraction is stored in the binarized image memory 10, as shown in FIG. 3B.

In step S4 a binarized image subjected to the filter process and output from the binarized image memory 10 is used to select a nostril region.

If the nostril region has been selected in step S4, an eye retrieving range 15 is set while deviation from the position 14 of the nostrils in the X direction and that in the Y direction are being factored in.

In step S5 retrieval of the eyes is performed by a retrieving method which uses a two-dimensional extracting filter corresponding to the shape of the eyes similar to that employed in the retrieval of the nostrils. Thus, a region 16 having binarized eyes is extracted.

If the eye region has been selected in step S6, a state of opening/closing of the eyes is, in step S7, determined in accordance with the straightness of the region 16 having the binarized eyes and the like.

After the determination of opening/closing in step S7 has been performed, the process is returned to step S1 so that the image of the face is photographed. Then, the process for each frame is repeated. If no region is selected in the process for selecting the nostril region in step S4 and in the process for selecting the eye region in step S6, also the process is returned to step S1.

FIG. 9 is a flow chart showing retrieval of the nostrils which is performed in step S3 shown in FIG. 8.

Description will be performed with reference to the flow chart shown in FIG. 9.

The two-dimensional filter process which is performed in step S11 is similar to that in step S3. Note that pixels for forming the binarized region extracted by the filter are called filter pass pixels.

In step S12, the previous position of the center of gravity of the nostrils is set as a point at which retrieval of the nostrils is started.

In step S13 the nostril region is spirally retrieved as shown in FIG. 5. In step S15 the coordinates (X, Y) of the pixel extracted in the spiral retrieval are recorded.

FIGS. 6A and 6B are diagrams showing the spiral retrieval which is performed in steps S13 to S15. As shown in FIG. 6A, retrieval is performed from the present pixel of interest into four directions toward the reference pixel. If the filter pass pixel exists in any one of the four directions, the reference pixel is made to be a next pixel of interest. The reference pixels with respect to the pixel of interest are set in the spiral retrieval table shown in FIG. 6B. As described above, the spiral retrieval in steps S13 to S15 is repeated until the filter pass pixel does not exist in the four directions toward the reference pixels.

When the filter pass pixel does not exist in the four directions toward the reference pixels in step S14, the operation is completed. Then, the operation proceeds to step S16 so that the position of the center of gravity of the nostril region is obtained in accordance with the recorded (X, Y) coordinates.

If the position of the center of gravity of the right and left nostril regions is detected in step S17, the position 14 of the nostrils is, in step S18, set in accordance with the center of the positions 19 and 20 of centers of gravity of the right and left nostrils, as shown in FIG. 7. If a plurality of positions of the centers of gravity of the right and left nostrils are detected, two positions of the centers of gravity are selected as the positions of the centers of gravity of the right and left nostrils in accordance with the relative positional relationship in the face. The position 14 of the nostrils and the positions 19 and 20 of the centers of gravity of the right and left nostrils for each frame are stored for one frame as the extraction positions and the position of the center of gravity of the previous frame.

Thus, the nostrils in the form close to a circle can be retrieved without a necessity of scanning all of pixels which constitute the region in which the nostrils have been binarized. The number of scanning operations in the X and Y directions can be reduced when the position of the center of gravity is determined. Hence it follows that the speed at which the nostril retrieving process can be raised.

Second Embodiment

A second embodiment is structured such that the process of the nostril-region extracting means according to the first embodiment for setting the point at which the retrieval of the nostrils is started is arranged as follows. As an alternative to the position of the center of gravity of the nostrils, points at which retrieval of the right and left nostrils is started are set from the position of the peak of the histogram of projection of the binarized region in the horizontal direction at the same intervals to the right and left. Therefore, if no filter pass pixel exists at the previous position of the center of gravity of the nostrils, a start point which permits the spiral retrieval can be set. As a result, stable extraction of the nostrils can be performed and the reliability of the extraction of the nostrils can be improved.

Figure 10:
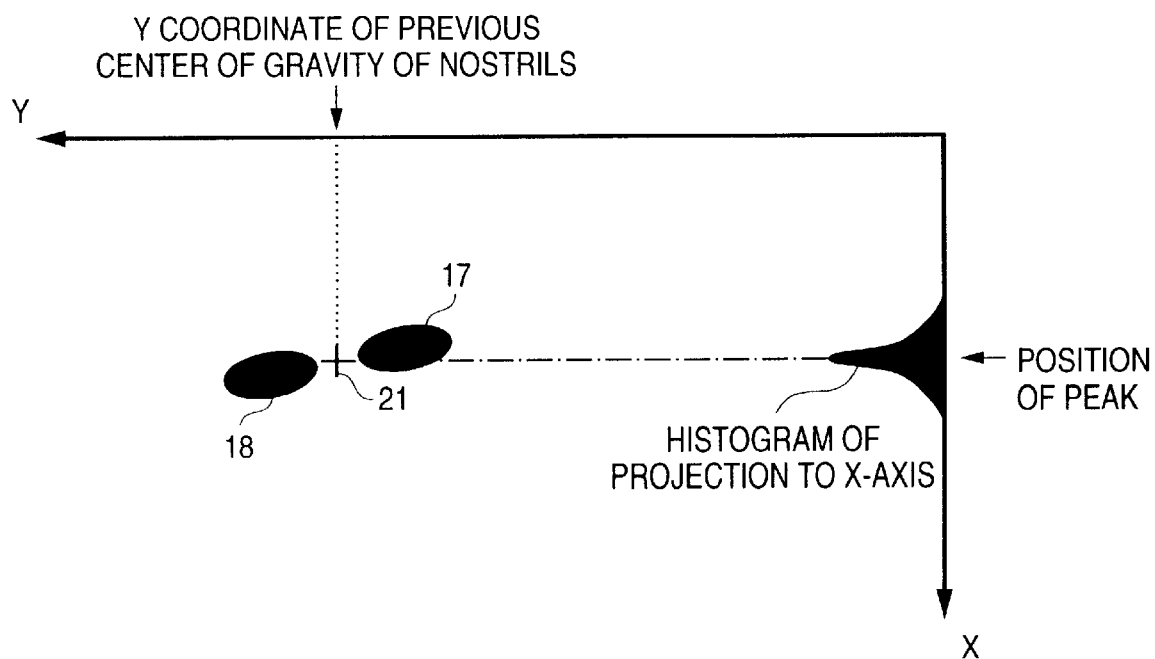
FIG. 10 is a diagram showing setting of temporary positions of nostrils which are references for the points at which the retrieval of the right and left nostrils is started from the position of the peak of the nostrils projected to the X axis.

FIG. 10 is a diagram showing a process of the face-image processing apparatus according to the second embodiment of the present invention. The process is a process for setting a temporary position of the nostrils, which is a reference for the point at which the retrieval of the right and left nostrils is started, from the position of the peak of the nostrils projected to the X axis.

Referring to FIG. 10, reference numerals 17 and 18 represent the same elements as those shown in FIG. 7. Reference numeral 21 represents the temporary position of the nostrils.

Figure 11:
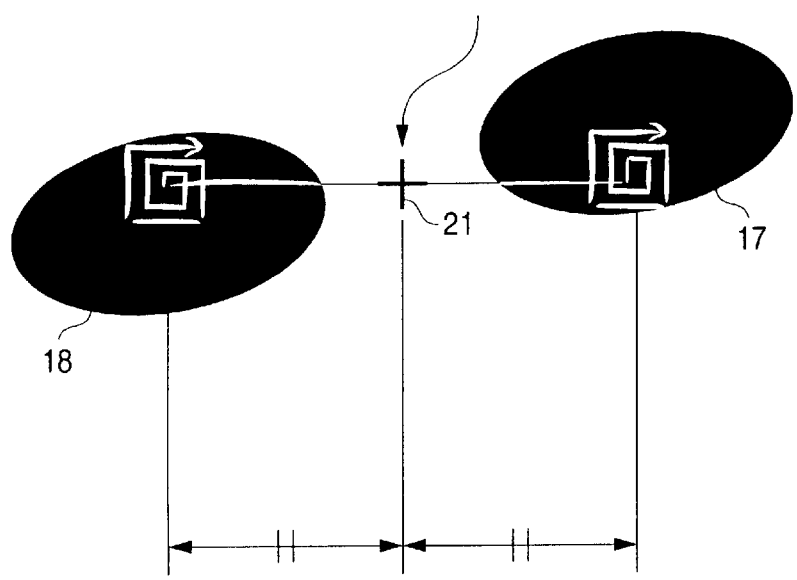
FIG. 11 is a diagram showing setting of points at which right and left retrieval is started from the temporary positions of the nostrils by a face-image processing apparatus according to a second embodiment of the present invention.
Figure 12:
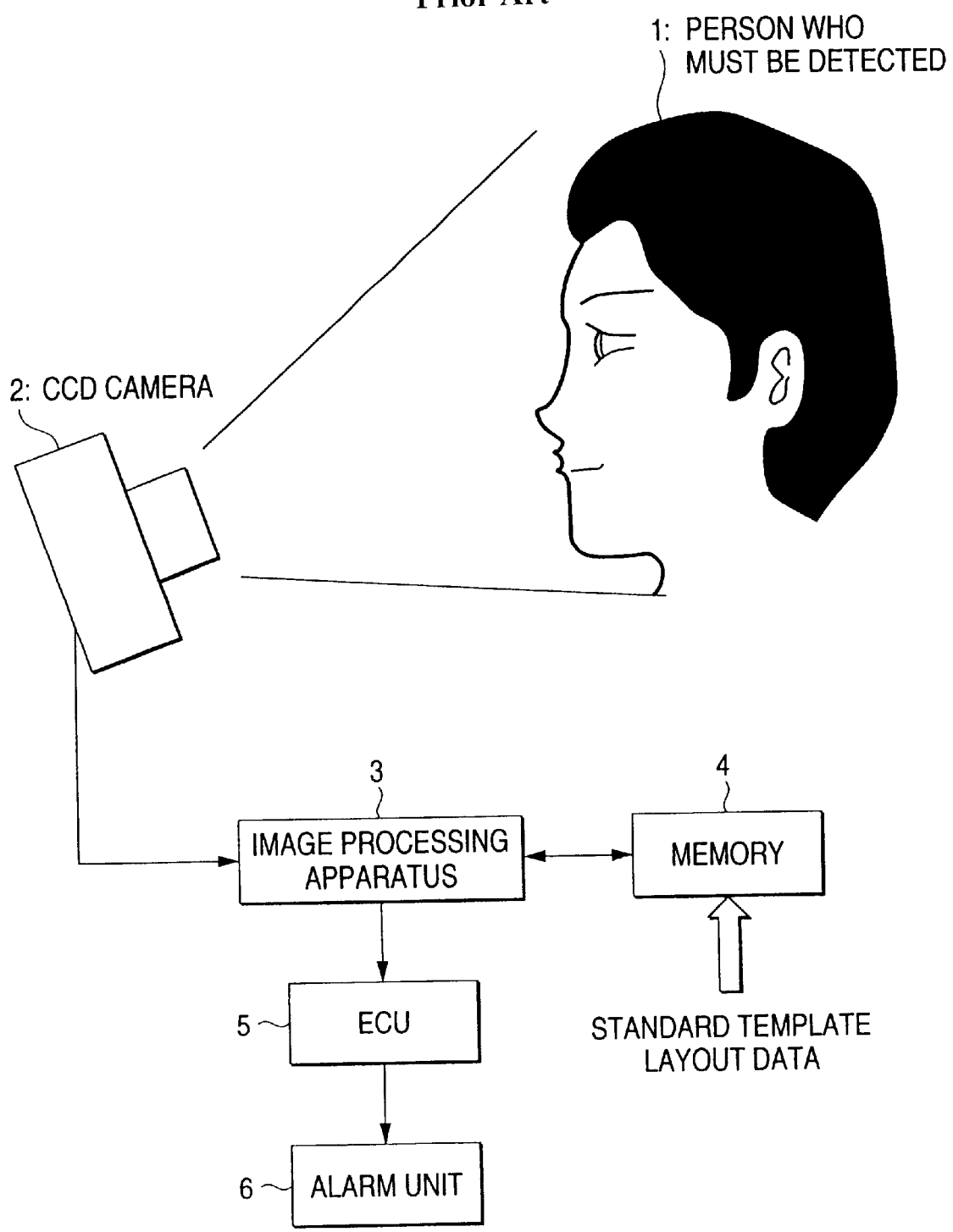
FIG. 12 is a schematic view showing the structure of a conventional face-image processing apparatus using matching of a template.

FIG. 11 is a diagram showing a process of the face-image processing apparatus according to the first embodiment of the present invention for setting the point at which the retrieval of the right and left nostrils from the temporary position of the nostrils is started.

Referring to FIG. 11, reference numerals 17, 18 and 21 represent the same elements as those shown in FIG. 10.

The process for setting the position at which the retrieval is started by using the peak of the histogram of a projected binarized region will now be described.

The portion in the vicinity of the nostrils in the binarized region shown in FIG. 3B is projected to X axis, as shown in FIG. 10. The temporary position 21 of the nostrils is set by using the intersection of the position of the peak of the projection histogram and the Y coordinates of the previous center of gravity of the nostrils.

As shown in FIG. 11, the points, at which the retrieval of the right and left nostrils is started, are set which are apart from each other at the same distance from the temporary position 21 of the nostrils to the right and left. The spiral retrieval is started at each of the points at which the retrieval of the right and left nostrils is started. The spiral retrieval is interrupted after a predetermined number of pixels are retrieved. If the number of the pixels in the right and left nostrils is smaller than the predetermined number, the region is not recognized as the nostril region. If a plurality of peaks exist, the retrieval of the right and left nostrils is performed for each peak.

When the both of the right and left nostrils satisfy the number of pixels with which the spiral retrieval can be performed, the regions are set as the right and left nostril regions. In accordance with the positions of the centers of gravity of the right and left regions, the positions of the nostrils are set.

As a result, if the face has moved excessively to set the previous positions of the centers of gravity of the nostrils as the points at which the retrieval of the nostrils is started, invalid setting of the position of the center of gravity can be prevented. Thus, the speed at which the nostril retrieving process is performed can be raised. Since time required to restore the state of the operation is shortened if the track of the nostrils is lost, time in which the track of the eyes is missed and in which the state of opening/closing of the eyes cannot be determined can be shortened. Therefore, missing of a state of opening/closing of the eyes can be prevented so that correct determination is performed.

If an assumption is made that no nostril region exists at the previous position of the center of gravity of the nostrils, there is apprehension that the spiral retrieval according to the second embodiment encounters great deviation from the position of the center of gravity of the actual region in which the nostrils have been binarized. Therefore, a composite method may be employed in which the spiral retrieval is used to only determine whether or not the region exists at the point at which the retrieval of the nostrils is started. Moreover, the determination of the center of gravity of the region is performed by the usual scanning in the X and Y directions.

The present invention structured as described above enables the following effects to be obtained.

The apparatus comprises: the image input means for inputting an image of the face; the nostril-region extracting means for extracting a binarized nostril region from the input image of the face; the eye-region extracting means for extracting a binarized eye region from the image of the face by using the binarized nostril region extracted by the nostril-region extracting means as a reference point; and the opening/closing determining means for determining opening/closing of the eyes in accordance with the binarized eye region extracted by the eye-region extracting means. Therefore, the state of opening/closing of the eyes can correctly be determined.

The nostril-region extracting means extracts a nostril region at a predetermined point at which the retrieval is started by sequentially and spirally retrieving a portion surrounding a retrieval start point. Therefore, the speed at which the process for extracting the nostril region is performed can be raised.

The apparatus further comprises the memory for storing one frame of the image of the face input by the image input means, wherein the image of the face in the quantity of one frame is used in a process for extracting the nostril region which is performed by the nostril-region extracting means and a process for determining opening/closing of the eyes which is performed by the opening/closing determining means. Therefore, opening/closing of the eyes can be determined for each frame.

The point at which the retrieval is started by the nostril-region extracting means is the position of a center of gravity calculated from the nostril region of the image of the face in the previous frame. Therefore, extraction of the nostril region can be performed by the efficient spiral retrieval.

The point at which the retrieval is started by the nostril-region extracting means consists of two positions apart from each other for the same distance from a peak position of a projected histogram of the image of the face in a horizontal direction of the image of the face. As a result, the spiral retrieval is permitted even at the first extraction or if no nostril region is extracted from the image in the previous frame.

What is claimed is:

1. A face-image processing apparatus comprising:

image input means for inputting an image of a face;

multi-value image storing means for storing multi-value image obtained by said image input means;

nostril-region extracting means for extracting a nostril multi-valued region from the multi-value image outputted by said multi-value image storing means;

eye-region extracting means for extracting a multi-valued eye region extracted from a multi-value image outputted by said multi-value image storing means with using a nostril region extracted by said nostril-region extracting means as a reference point;

binarized image storing means for storing a result outputted from said nostril-region extracting means and said eye-region extracting means as a binarized region; and opening/closing determining means for determining opening/closing of the eyes in accordance with a feature of a shape of the binarized eye-region outputted by said binarized image storing means, wherein
said nostril-region extracting means extracts a nostril region at which a retrieval is started from a position of a center of gravity of a previous nostril by spirally retrieving a portion surrounding the retrieval start point.

2. A face-image processing apparatus comprising:

image input means for inputting an image of a face;

multi-value image storing means for storing multi-value image obtained by said image input means;

nostril-region extracting means for extracting a nostril multi-valued region from the multi-value image outputted by said multi-value image storing means;

eye-region extracting means for extracting a multi-valued eye region extracted from a multi-value image outputted by said multi-value image storing means with using a nostril region extracted by said nostril-region extracting means as a reference point;

binarized image storing means for storing a result outputted from said nostril-region extracting means and said eye-region extracting means as a binarized region; and opening/closing determining means for determining opening/closing of the eyes in accordance with a feature of a shape of the binarized eye-region outputted by said binarized image storing means, wherein
said nostril-region extracting means extracts a nostril region at which a retrieval is started from a peak position of a projected histogram of the image of the face by spirally retrieving two regions apart from each other for the same distance between a right and a left nostrils surrounding the retrieval start point, if it is an initial extracting time or if there is no nostril-region at a previous position of a center of gravity.

* * * * *